(12) United States Patent
Burson

(10) Patent No.: US 12,151,689 B2
(45) Date of Patent: Nov. 26, 2024

(54) METHODS AND SYSTEMS FOR DETERMINING DIAGNOSTIC COVERAGE OF SENSORS TO PREVENT GOAL VIOLATIONS OF AUTONOMOUS VEHICLES

(71) Applicant: Argo AI, LLC, Pittsburgh, PA (US)

(72) Inventor: Schuyler Burson, Royal Oak, MI (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 519 days.

(21) Appl. No.: 17/498,166

(22) Filed: Oct. 11, 2021

(65) Prior Publication Data

US 2023/0113560 A1 Apr. 13, 2023

(51) Int. Cl.
*B60W 50/02* (2012.01)
*B60W 60/00* (2020.01)

(52) U.S. Cl.
CPC ...... *B60W 50/0205* (2013.01); *B60W 60/001* (2020.02); *B60W 2050/0215* (2013.01); *B60W 2420/403* (2013.01); *B60W 2420/408* (2024.01)

(58) Field of Classification Search
CPC .......... B60W 50/0205; B60W 60/001; B60W 2050/0215; B60W 2420/403; B60W 2420/408
See application file for complete search history.

(56) References Cited

U.S. PATENT DOCUMENTS

| | | | |
|---|---|---|---|
| 9,218,232 B2 | 12/2015 | Khalastchi et al. | |
| 2014/0200699 A1* | 7/2014 | Vincelli | G06F 11/008 |
| | | | 707/812 |
| 2020/0081758 A1* | 3/2020 | Vincelli | G06F 11/079 |
| 2020/0341126 A1 | 10/2020 | Yates et al. | |
| 2023/0192139 A1* | 6/2023 | Kumavat | B60W 60/00 |
| | | | 701/25 |

FOREIGN PATENT DOCUMENTS

| | | |
|---|---|---|
| KR | 1020150012652 A | 2/2015 |
| KR | 1020180130475 A | 12/2018 |
| WO | 2018130474 A1 | 7/2018 |

OTHER PUBLICATIONS

Granig et al., "Calculation of Failure Detection Probability on Safety Mechanisms of Correlated Sensor Signals According to ISO 26262", Mar. 28, 2017, SAE International Journal of Passenger Cars—Electronic and Electrical Systems, pp. 144-155, vol. 10, issue 1.

"Road vehicles—Functional safety", International Organization for Standardization (ISO), 2011, pp. 1-9, retrieved from https://en.wikipedia.org/wiki/ISO_26262.

* cited by examiner

*Primary Examiner* — Thomas Ingram
(74) *Attorney, Agent, or Firm* — The Webb Law Firm

(57) ABSTRACT

Systems may include a processor to, in response to determining at least one segment of a field of view (FOV) of a first sensor of an autonomous vehicle that overlaps with a FOV of at least one second sensor of the autonomous vehicle, calculate a scaling factor for diagnostic coverage for the at least one segment based on a value of modality overlap (MoD) for the at least one segment, calculate, based on the scaling factor, a value of a metric of hardware failure for the first sensor, and compare the value of the metric of hardware failure to a threshold value to determine whether to increase a diagnostic coverage of the first sensor. Methods, computer program products, and autonomous vehicles are also disclosed.

19 Claims, 10 Drawing Sheets

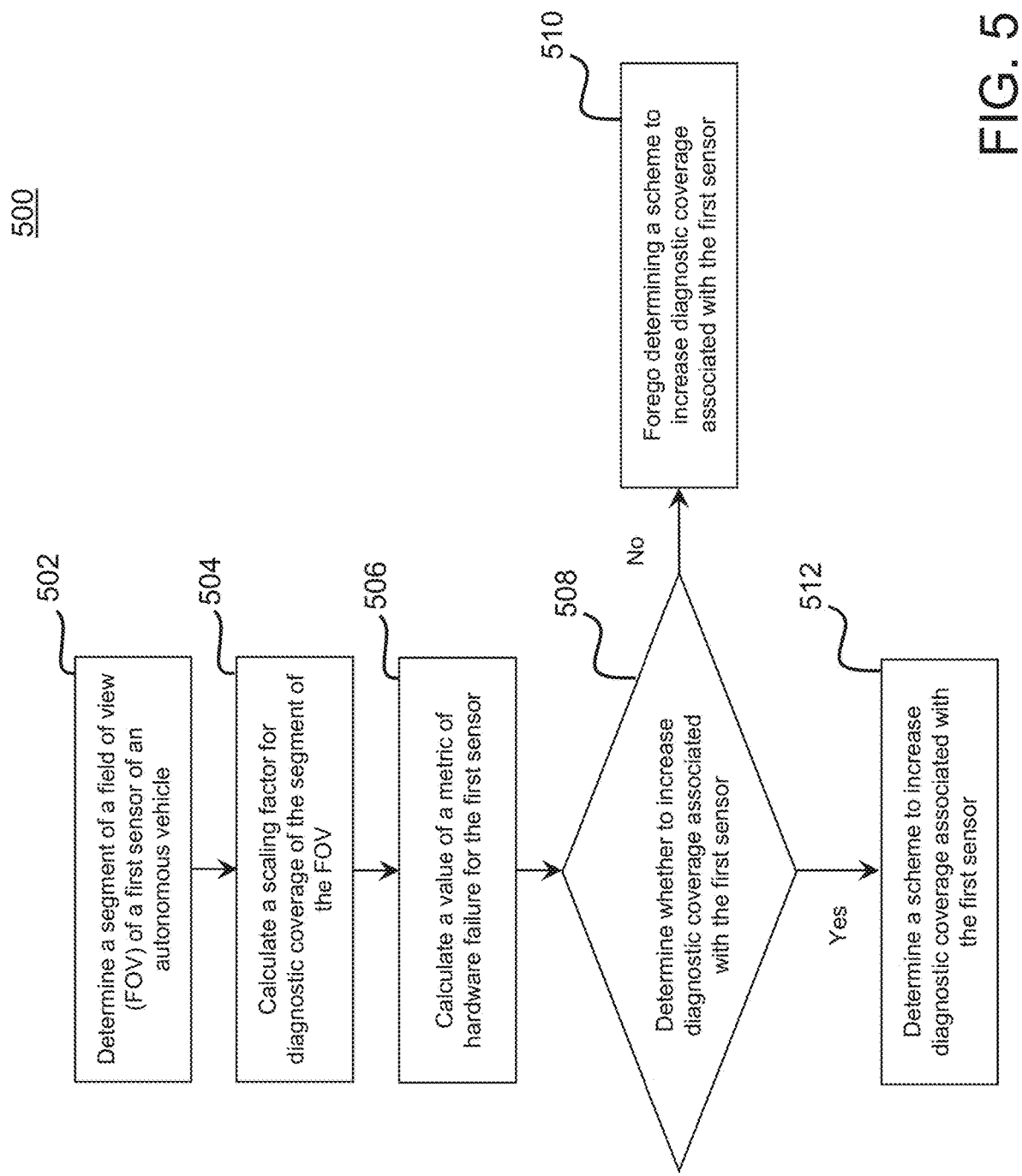

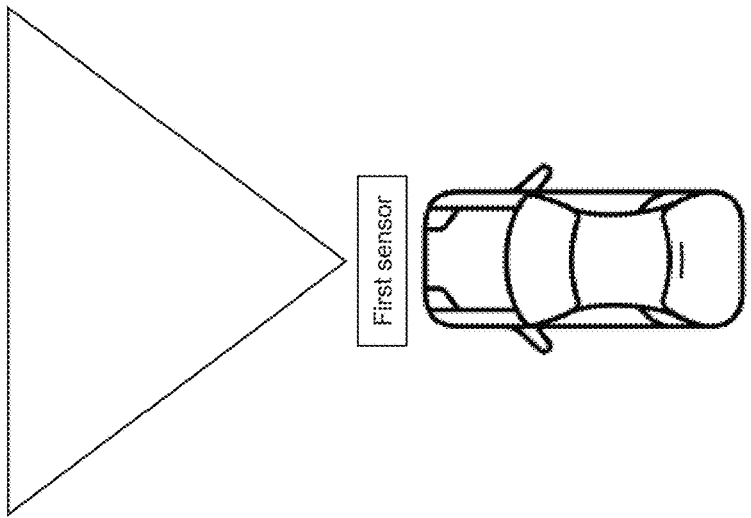
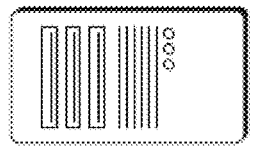
FIG. 6A

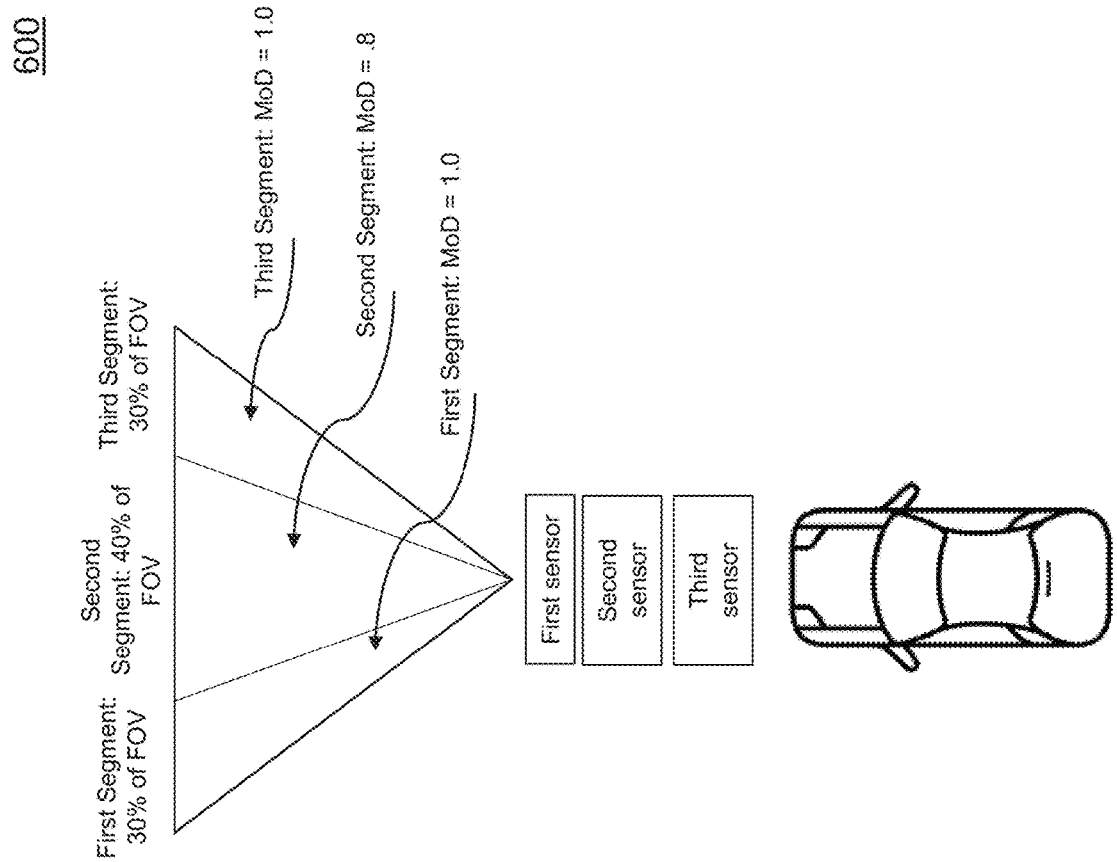
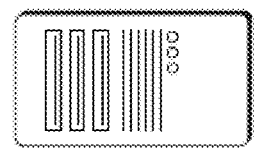
FIG. 6C

METHODS AND SYSTEMS FOR DETERMINING DIAGNOSTIC COVERAGE OF SENSORS TO PREVENT GOAL VIOLATIONS OF AUTONOMOUS VEHICLES

BACKGROUND

1. Field

This disclosure relates generally to aspects of autonomous vehicles and, in some non-limiting embodiments, to determining whether diagnostic coverage of one or more sensors of an autonomous vehicle is sufficient to prevent goal violations.

2. Technical Considerations

An autonomous vehicle (e.g., a driverless car, a driverless auto, a self-driving car, a robotic car, etc.) is a vehicle that is capable of sensing an environment of the vehicle and traveling (e.g., navigating, moving, etc.) in the environment without manual input from an individual. An autonomous vehicle uses a variety of techniques to detect the environment of the autonomous vehicle, such as radar, laser light, Global Positioning System (GPS), odometry, and/or computer vision. In some instances, an autonomous vehicle uses a control system to interpret information received from one or more sensors, to identify a route for traveling, to identify an obstacle in a route, and to identify relevant traffic signs associated with a route.

Standards may be used to define levels of functionality that are required with regard to systems of an autonomous vehicle. For example, ISO 26262 is an international standard, defined by the International Organization for Standardization (ISO), for electronic systems that are installed in production road vehicles. The ISO 26262 standard is intended to address potential hazards caused by malfunctions of these electronic systems. ISO 26262 relies on Automotive Safety Integrity Levels (ASILs) for specifying necessary goals that a component of an electronic system of a vehicle must meet to achieve an acceptable level of risk.

An ASIL may refer to a goal, which is implemented as a level of risk reduction needed to achieve a tolerable risk. ISO 26262 defines four ASILs: ASIL A, ASIL B, ASIL C, and ASIL D. ASIL D dictates the highest integrity requirements on the component and ASIL A the lowest. The determination of an ASIL may be the result of hazard analysis and risk assessment. In the context of ISO 26262, a hazard may be assessed based on a relative impact of hazardous effects related to a system and is adjusted for relative likelihoods of the hazard manifesting the hazardous effects.

SUMMARY

Provided are systems, methods, products, apparatuses, and/or devices for determining whether diagnostic coverage of one or more sensors of an autonomous vehicle is sufficient to prevent violations of goals.

According to some non-limiting embodiments, provided is a system comprising a memory; and at least one processor coupled to the memory and configured to: in response to determining at least one segment of a field of view (FOV) of a first sensor of an autonomous vehicle that overlaps with a FOV of at least one second sensor of the autonomous vehicle, calculate a scaling factor for diagnostic coverage for the at least one segment based on a value of modality overlap (MoD) for the at least one segment; calculate, based on the scaling factor, a value of a metric of hardware failure for the first sensor; and compare the value of the metric of hardware failure to a threshold value to determine whether to increase a diagnostic coverage of the first sensor.

According to some non-limiting embodiments, provided is a system comprising: a memory; and at least one processor coupled to the memory and configured to: in response to determining at least one segment of a field of view (FOV) of a first sensor of an autonomous vehicle that overlaps with a FOV of at least one second sensor of the autonomous vehicle, calculate a scaling factor for diagnostic coverage for the at least one segment based on a value of modality overlap (MoD) for the at least one segment; calculate, based on the scaling factor, a value of a metric of hardware failure for the first sensor; and compare the value of the metric of hardware failure to a threshold value to determine whether to increase a diagnostic coverage of the first sensor.

According to some non-limiting embodiments, provided is a computer program product comprising at least one non-transitory computer-readable medium comprising one or more instructions that, when executed by at least one processor, cause the at least one processor to: in response to determining at least one segment of a field of view (FOV) of a first sensor of an autonomous vehicle that overlaps with a FOV of at least one second sensor of the autonomous vehicle, calculate a scaling factor for diagnostic coverage for the at least one segment based on a value of modality overlap (MoD) for the at least one segment; calculate, based on the scaling factor, a value of a metric of hardware failure for the first sensor; and compare the value of the metric of hardware failure to a threshold value to determine whether to increase a diagnostic coverage of the first sensor.

According to some non-limiting embodiments, provided is a computer program product comprising at least one non-transitory computer-readable medium comprising one or more instructions that, when executed by at least one processor, cause the at least one processor to: in response to determining at least one segment of a field of view (FOV) of a first sensor of an autonomous vehicle that overlaps with an FOV of at least one second sensor of the autonomous vehicle, calculate a scaling factor for diagnostic coverage for the at least one segment based on a value of modality overlap (MoD) for the at least one segment; calculate, based on the scaling factor, a value of a metric of hardware failure for the first sensor; and compare the value of the metric of hardware failure to a threshold value to determine whether to increase a diagnostic coverage of the first sensor.

According to some non-limiting embodiments, provided is a method, comprising: in response to determining at least one segment of a field of view (FOV) of a first sensor of an autonomous vehicle that overlaps with a FOV of at least one second sensor of the autonomous vehicle, calculating, with at least one processor, a scaling factor for diagnostic coverage for the at least one segment based on a value of modality overlap (MoD) for the at least one segment; calculating, with the at least one processor, a value of a metric of hardware failure for the first sensor based on the scaling factor; and comparing, with the at least one processor, the value of the metric of hardware failure to a threshold value to determine whether to increase a diagnostic coverage of the first sensor.

According to some non-limiting embodiments, provided is a method, comprising: in response to determining at least one segment of a field of view (FOV) of a first sensor of an autonomous vehicle that overlaps with a FOV of at least one second sensor of the autonomous vehicle, calculating, with at least one processor, a scaling factor for diagnostic coverage for the at least one segment based on a value of modality overlap (MoD) for the at least one segment; calculating, with the at least one processor, a value of a metric of hardware failure for the first sensor based on the scaling factor; and comparing, with the at least one processor, the value of the metric of hardware failure to a threshold value to determine whether to increase a diagnostic coverage of the first sensor.

Further embodiments are set forth in the following numbered clauses:

Clause 1: A system comprising: a memory; and at least one processor coupled to the memory and configured to: in response to determining at least one segment of a field of view (FOV) of a first sensor of an autonomous vehicle that overlaps with a FOV of at least one second sensor of the autonomous vehicle, calculate a scaling factor for diagnostic coverage for the at least one segment based on a value of modality overlap (MoD) for the at least one segment; calculate, based on the scaling factor, a value of a metric of hardware failure for the first sensor; and compare the value of the metric of hardware failure to a threshold value to determine whether to increase a diagnostic coverage of the first sensor.

Clause 2: The system of clause 1, wherein, when calculating the value of the metric of hardware failure for the first sensor, the at least one processor is configured to: calculate a value of Probabilistic Metric for random Hardware Failures (PMHF) for the first sensor.

Clause 3: The system of clause 1 or 2, wherein the at least one processor is further configured to: calculate a value of latent fault metric (LFM) for the first sensor; and calculate a value of single-point fault metric (SPFM) for the first sensor.

Clause 4: The system of any of clauses 1-3, wherein the first sensor comprises a light detection and ranging (LiDAR) sensor, an image sensor, or a radar sensor.

Clause 5: The system of any of clauses 1-4, wherein the at least one second sensor comprises a LiDAR sensor, an image sensor, or a radar sensor.

Clause 6: The system of any of clauses 1-5, wherein the at least one processor is further configured to: determine that additional sensor coverage is necessary in the FOV of the first sensor based on determining that the value of the metric of hardware failure for the first sensor does not satisfy the threshold value associated with the metric of hardware failure.

Clause 7: The system of any of clauses 1-6, wherein the at least one processor is further configured to: determine the value of MoD for the at least one segment of the FOV of the first sensor based on a modality of the first sensor and a modality of the at least one second sensor, wherein the modality of the first sensor is different from the modality of the at least one second sensor.

Clause 8: The system of any of clauses 1-7, wherein the at least one processor is further configured to: when determining whether to increase the diagnostic coverage of the first sensor, the at least one processor is configured to determine not to increase diagnostic coverage of the first sensor based on determining that the value of the metric of hardware failure for the first sensor satisfies the threshold value associated with the metric of hardware failure.

Clause 9: A computer program product comprising at least one non-transitory computer-readable medium comprising one or more instructions that, when executed by at least one processor, cause the at least one processor to: in response to determining at least one segment of a field of view (FOV) of a first sensor of an autonomous vehicle that overlaps with an FOV of at least one second sensor of the autonomous vehicle, calculate a scaling factor for diagnostic coverage for the at least one segment based on a value of modality overlap (MoD) for the at least one segment; calculate, based on the scaling factor, a value of a metric of hardware failure for the first sensor; and compare the value of the metric of hardware failure to a threshold value to determine whether to increase a diagnostic coverage of the first sensor.

Clause 10: The computer program product of clause 9, wherein the one or more instructions that cause the at least one processor to calculate the value of the metric of hardware failure for the first sensor, the at least one processor is programmed or configured to: calculate a value of Probabilistic Metric for random Hardware Failures (PMHF) for the first sensor.

Clause 11: The computer program product of clauses 9 or 10, wherein the one or more instructions further cause the at least one processor to: calculate a value of latent fault metric (LFM) for the first sensor; or calculate a value of single-point fault metric (SPFM) for the first sensor.

Clause 12: The computer program product of any of clauses 9-11, wherein the first sensor comprises a light detection and ranging (LiDAR) sensor, an image sensor, or a radar sensor.

Clause 13: The computer program product of any of clauses 9-12, wherein the at least one second sensor comprises a LiDAR sensor, an image sensor, or a radar sensor.

Clause 14: The computer program product of any of clauses 9-13, wherein the one or more instructions further cause the at least one processor to: determine that additional sensor coverage is necessary in the FOV of the first sensor based on determining that the value of the metric of hardware failure for the first sensor does not satisfy the threshold value associated with the metric of hardware failure.

Clause 15: The computer program product of any of clauses 9-14, wherein the one or more instructions further cause the at least one processor to: determine the value of MoD for the at least one segment of the FOV of the first sensor based on a modality of the first sensor and a modality of the at least one second sensor, wherein the modality of the first sensor is different from the modality of the at least one second sensor.

Clause 16: A method, comprising: in response to determining at least one segment of a field of view (FOV) of a first sensor of an autonomous vehicle that overlaps with a FOV of at least one second sensor of the autonomous vehicle, calculating, with at least one processor, a scaling factor for diagnostic coverage for the at least one segment based on a value of modality overlap (MoD) for the at least one segment; calculating, with the at least one processor, a value of a metric of hardware failure for the first sensor based on the scaling factor; and comparing, with the at least one processor, the value of the metric of hardware failure to a threshold value to determine whether to increase a diagnostic coverage of the first sensor.

Clause 17: The method of clause 16, wherein calculating the value of the metric of hardware failure for the first sensor comprises: calculating a value of Probabilistic Metric for random Hardware Failures (PMHF) for the first sensor.

Clause 18: The method of clauses 16 or 17, further comprising: calculating a value of latent fault metric (LFM) for the first sensor; and calculating a value of single-point fault metric (SPFM) for the first sensor.

Clause 19: The method of any of clauses 16-18, further comprising: determining that additional sensor coverage is necessary in the FOV of the first sensor based on determining that the value of the metric of hardware failure for the first sensor does not satisfy the threshold value associated with the metric of hardware failure.

Clause 20: The method of any of clauses 16-19, further comprises: determining the value of MoD for the at least one segment of the FOV of the first sensor based on a modality of the first sensor and a modality of the at least one second sensor, wherein the modality of the first sensor is different from the modality of the at least one second sensor.

BRIEF DESCRIPTION OF THE DRAWINGS

Additional advantages and details are explained in greater detail below with reference to the exemplary embodiments that are illustrated in the accompanying schematic figures, in which:

FIG. 5 is a flowchart of a non-limiting embodiment of a process for determining whether diagnostic coverage of one or more sensors of an autonomous vehicle is sufficient to prevent violations of goals;

FIGS. 6A-6D are diagrams of a non-limiting embodiment of an implementation of a process for determining whether diagnostic coverage of one or more sensors of an autonomous vehicle is sufficient to prevent violations of goals.

DESCRIPTION

Figure 1:
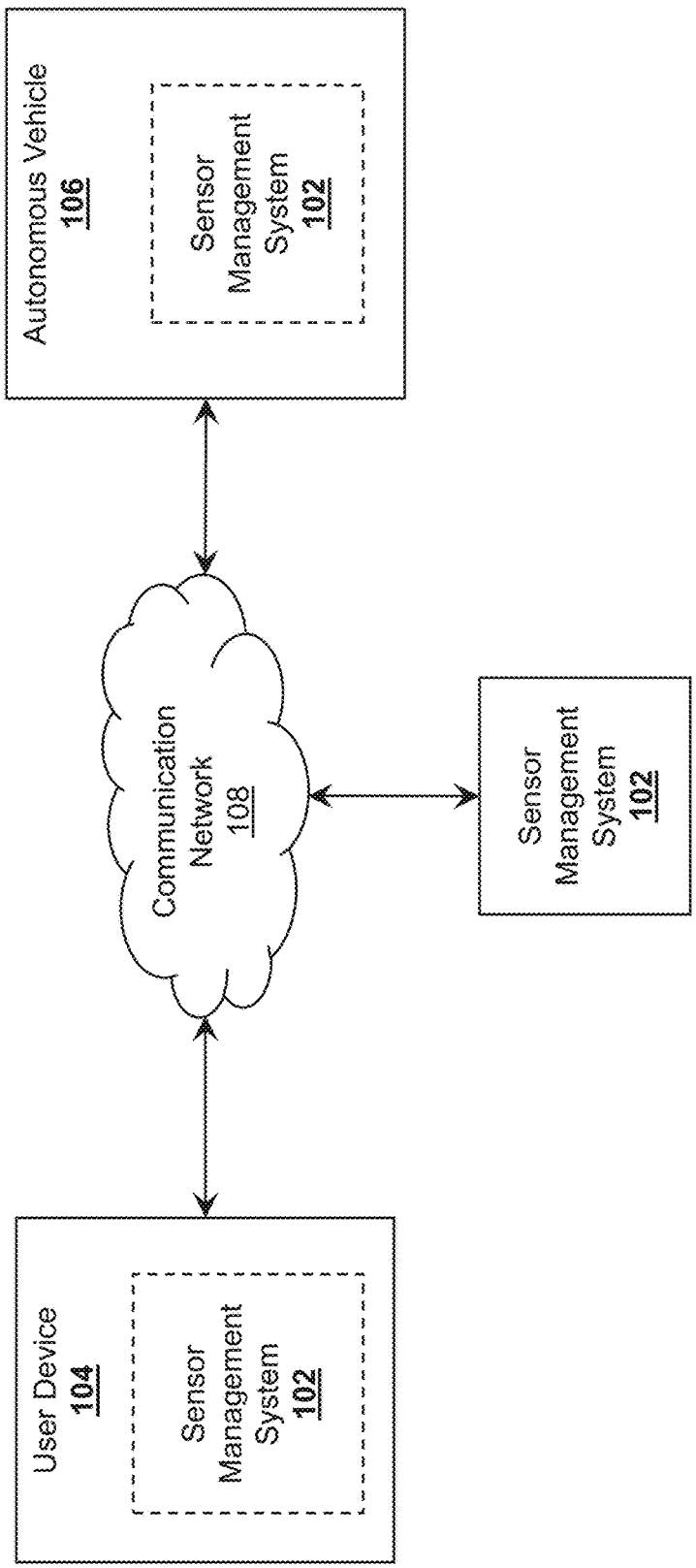
FIG. 1 is a diagram of a non-limiting embodiment of an environment in which systems, methods, and/or computer program products, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." As used in the specification and the claims, the singular form of "a," "an," and "the" include plural referents, such as unless the context clearly dictates otherwise. Additionally, as used herein, the terms "set" and "group" are intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise. Further, the phrase "based on" may mean "in response to" and be indicative of a condition for automatically triggering a specified operation of an electronic device (e.g., a processor, a computing device, etc.) as appropriately referred to herein.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" is a vehicle having a processor, programming instructions, and drivetrain components that are controllable by the processor without requiring a human operator. An autonomous vehicle may be fully autonomous in that the autonomous vehicle does not require a human operator for most or all driving conditions and functions. In some non-limiting embodiments, the autonomous vehicle may be semi-autonomous in that a human operator may be required in certain conditions or for certain operations, or that a human operator may override the vehicle's autonomous system and may take control of the vehicle.

As used herein, the term "computing device" may refer to one or more electronic devices configured to process data. A computing device may, in some examples, include the necessary components to receive, process, and output data, such as a processor, a display, a memory, an input device, a network interface, and/or the like. In some non-limiting embodiments, a computing device may be a mobile device. As an example, a mobile device may include a cellular phone (e.g., a smartphone or standard cellular phone), a portable computer (e.g., a tablet), a wearable device (e.g., watches, glasses, lenses, clothing, and/or the like), a personal digital assistant (PDA), and/or other like devices. In some non-limiting embodiments, a computing device may be a computer that is not portable (e.g., is not a mobile device), such as a desktop computer (e.g., a personal computer).

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, desktop computers, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "user interface" or "graphical user interface" may refer to a display generated by a computing device, with which a user may interact, either directly or indirectly (e.g., through a keyboard, mouse, touchscreen, etc.).

An operator of an autonomous vehicle may be required to provide rationale that sufficient diagnostic coverage exists based on systems of the autonomous vehicle to prevent random hardware faults that may lead to a violation of a goal in order to be able to operate the autonomous in a real world environment. In some non-limiting embodiments, a component of an electronic system of an autonomous vehicle may be required to meet one or more goals to achieve an acceptable level of risk. For example, to comply with an ASIL-D goal as defined by ISO 26262, such as the probabilistic metric for random hardware failures (PMHF), of the overall system must meet a target value of random hardware failure of 10 failure in time (FIT), where 1 FIT=$10^{-9}$/h (e.g., 1 failure per billion hours of operation). When an item, such as an autonomous vehicle is made up of several systems, a derived target value for an ASIL-D goal can be directly allocated to each system composing the autonomous vehicle. In one example, this system may include each sensor (e.g., an image sensor, such as a camera, a light detection and ranging (LiDAR) sensor, a radar sensor, etc.) of a group of sensors of the autonomous vehicle that may be required to have a PMHF of 10 FIT due to each sensor contributing to (e.g., contributing to a derivation from) an ASIL-D goal.

However, it may not be possible with current technology to meet the target value of PMHF based on a PMHF for each sensor by itself, so a method of taking into account PMHF values from suppliers and ensuring coverage for each sensor on the system is needed.

The present disclosure provides systems, methods, and computer program products that determine whether a diagnostic coverage of one or more sensors of an autonomous vehicle is sufficient to prevent violations of one or more goals. In some non-limiting embodiments, the present disclosure includes a sensor management system that includes a memory and at least one processor coupled to the memory and configured to determine at least one segment of a field of view (FOV) of a first sensor of an autonomous vehicle that overlaps with an FOV of at least one second sensor of the autonomous vehicle, calculate a scaling factor for diagnostic coverage for the at least one segment of the FOV of the first sensor based on the value of modality overlap (MoD) for the at least one segment, calculate a value of a metric of hardware failure for the first sensor based on the scaling factor, and determine whether to increase diagnostic coverage of the first sensor based on the value of the metric of hardware failure for the first sensor. In some non-limiting embodiments, when determining whether to increase diagnostic coverage of the first sensor based on the value of the metric of hardware failure for the first sensor, the at least one processor is programmed or configured to compare the value of the metric of hardware failure to a threshold value to determine whether to increase a diagnostic coverage of the first sensor.

In some non-limiting embodiments, when calculating the value of the metric of hardware failure for the first sensor, the at least one processor is programmed or configured to calculate a value of PMHF for the first sensor. In some non-limiting embodiments, the at least one processor is further programmed or configured to calculate a value of latent fault metric (LFM) for the first sensor and/or calculate a value of single-point fault metric (SPFM) for the first sensor. In some non-limiting embodiments, the first sensor comprises a light detection and ranging (LiDAR) sensor, an image sensor, or a radar sensor. In some non-limiting embodiments, the at least one second sensor comprises a LiDAR sensor, an image sensor, or a radar sensor.

In some non-limiting embodiments, the at least one processor is further programmed or configured to determine that additional sensor coverage is necessary or not necessary in the FOV of the first sensor. In some non-limiting embodiments, the at least one processor is further programmed or configured to determine the value of MoD for the at least one segment of the FOV of the first sensor based on a modality of the first sensor and a modality of the at least one second sensor, wherein the modality of the first sensor is different from the modality of the at least one second sensor. In some non-limiting embodiments, wherein the at least one processor is further programmed or configured to compare the value of the metric of hardware failure for the first sensor to a threshold value associated with the metric of hardware failure, and when determining whether to increase the diagnostic coverage of the first sensor, the at least one processor is programmed or configured to determine to or not to increase diagnostic coverage of the first sensor based on determining whether the value of the metric of hardware failure for the first sensor satisfies the threshold value associated with the metric of hardware failure.

In this way, the sensor system may provide a user with a way to ensure that a metric of hardware failure, such as a PMHF value, of each sensor of the autonomous vehicle are met prior to including any diagnostic coverage at a system level (e.g., based on comparisons). In addition, the sensor system may provide for the ability to gain redundancy and/or operational mechanisms through redundant versions of the same sensor modalities (e.g., sensors that have the same modality may be overlapping) and/or to gain redundancy and/or operational mechanisms through overlap of different sensor modalities in different scenarios (e.g., rain, snow, etc.) and different objects (e.g., colors, materials, etc.).

Referring now to FIG. 1, FIG. 1 is a diagram of an example environment 100 in which systems, methods, products, apparatuses, and/or devices described herein, may be implemented. As shown in FIG. 1, environment 100 may include sensor management system 102, user device 104, autonomous vehicle 106, and communication network 108.

Sensor management system 102 may include one or more devices capable of communicating with user device 104 and/or autonomous vehicle 106 via communication network 108. For example, sensor management system 102 may include a computing device, such as a server, a group of servers, and/or other like devices.

User device 104 may include one or more devices capable of communicating with sensor management system 102 and/or autonomous vehicle 106 via communication network 108. For example, sensor management system 102 may include a computing device, such as a mobile device, a desktop computer, and/or other like devices. In some non-limiting embodiments, sensor management system 102 may communicate with user device 104 via an application (e.g., a mobile application) stored on user device 104. In some non-limiting embodiments, user device 104 may include one or more sensors (e.g., a LiDAR sensor, a radio frequency identification (RFID) sensor, a light sensor, an image sensor, such as a camera, a laser sensor, a barcode reader, an audio sensor, etc.). In some non-limiting embodiments, sensor management system 102 may be a component of user device 104.

Autonomous vehicle 106 may include one or more devices capable of communicating with sensor management system 102 and/or user device 104 via communication network 108. For example, autonomous vehicle 106 may include a computing device, such as a server, a group of servers, and/or other like devices. In some non-limiting embodiments, sensor management system 102 may be a component of autonomous vehicle 106. In some non-limiting embodiments, user device 104 may be a component of autonomous vehicle 106.

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. For example, autonomous vehicle 106 may incorporate the functionality of sensor management system 102 such that autonomous vehicle 106 can operate without communication to or from sensor management system 102. Additionally or alternatively, a set of devices and/or systems (e.g., one or more devices or systems) of environment 100 may perform one or more functions described as being performed by another set of devices and/or systems of environment 100.

Figure 2:
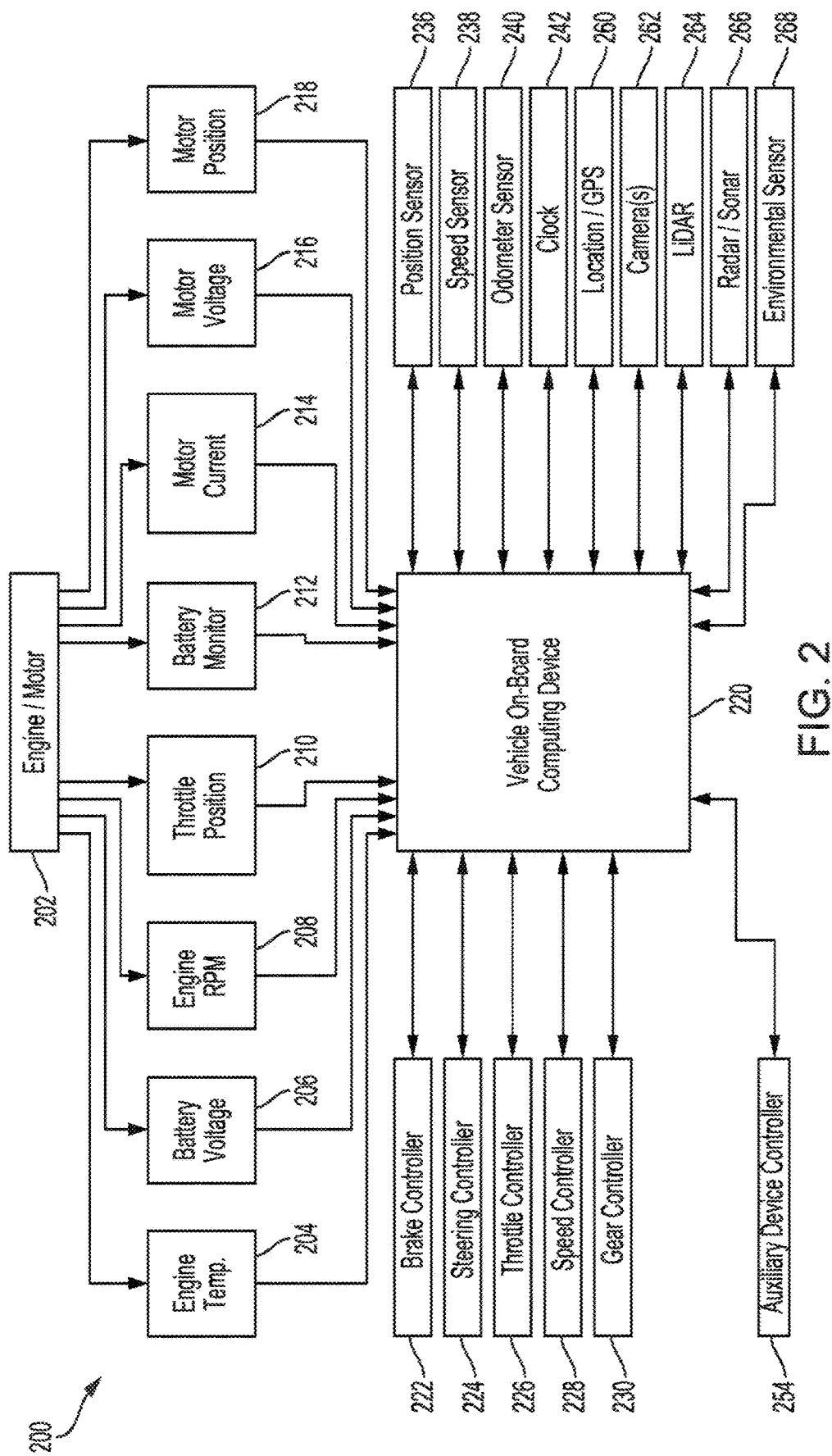
FIG. 2 is an diagram of a non-limiting embodiment of an architecture for an autonomous vehicle.

Referring now to FIG. 2, FIG. 2 is an illustration of an illustrative system architecture 200 for a vehicle. Autonomous vehicle 106 may include a same or similar system architecture as that of system architecture 200 shown in FIG. 2.

As shown in FIG. 2, system architecture 200 may include engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine rotations per minute (RPM) sensor 208, throttle position sensor 210, and/or a seat occupancy sensor (not shown). In an electric or hybrid vehicle, the vehicle may have an electric motor, and may have sensors, such as battery monitor sensor 212 (e.g., to measure current, voltage, and/or temperature of the battery), motor current sensor 214, motor voltage sensor 216, and/or motor position sensors 218, such as resolvers and encoders.

System architecture 200 may include operational parameter sensors, which may be common to both types of vehicles, and may include, for example: position sensor 236, such as an accelerometer, gyroscope, and/or inertial measurement unit; speed sensor 238; and/or odometer sensor 240. System architecture 200 may include clock 242 that is used to determine vehicle time during operation. Clock 242 may be encoded into vehicle on-board computing device 220. It may be a separate device or multiple clocks may be available.

System architecture 200 may include various sensors that operate to gather information about an environment in which the vehicle is operating and/or traveling. These sensors may include, for example: location sensor 260 (e.g., a global positioning system (GPS) device); object detection sensors, such as one or more cameras 262; LiDAR sensor system 264; and/or radar and/or sonar system 266. The sensors may include environmental sensors 268, such as a precipitation sensor, an ambient temperature sensor, and/or an acoustic sensor (e.g., a microphone, a phased-array of microphones, and/or the like). The object detection sensors may enable system architecture 200 to detect objects that are within a given distance range of the vehicle in any direction, and environmental sensors 268 may collect data about environmental conditions within an area of operation and/or travel of the vehicle.

During operation of system architecture 200, information is communicated from the sensors of system architecture 200 to vehicle on-board computing device 220. Vehicle on-board computing device 220 analyzes the data captured by the sensors and optionally controls operations of the vehicle based on results of the analysis. For example, vehicle on-board computing device 220 may control: braking via brake controller 222; direction via steering controller 224; speed and acceleration via throttle controller 226 (e.g., in a gas-powered vehicle) or motor speed controller 228, such as a current level controller (e.g., in an electric vehicle); differential gear controller 230 (e.g., in vehicles with transmissions); and/or other controllers, such as auxiliary device controller 254.

Geographic location information may be communicated from location sensor 260 to vehicle on-board computing device 220, which may access a map of the environment including map data that corresponds to the location information to determine known fixed features of the environment, such as streets, buildings, stop signs, and/or stop/go signals. Captured images from cameras 262 and/or object detection information captured from sensors, such as LiDAR sensor system 264 is communicated from those sensors to vehicle on-board computing device 220. The object detection information and/or captured images are processed by vehicle on-board computing device 220 to detect objects in proximity to the vehicle. Any known or to be known technique for making an object detection based on sensor data and/or captured images can be used in the embodiments disclosed in the present disclosure.

Figure 3:
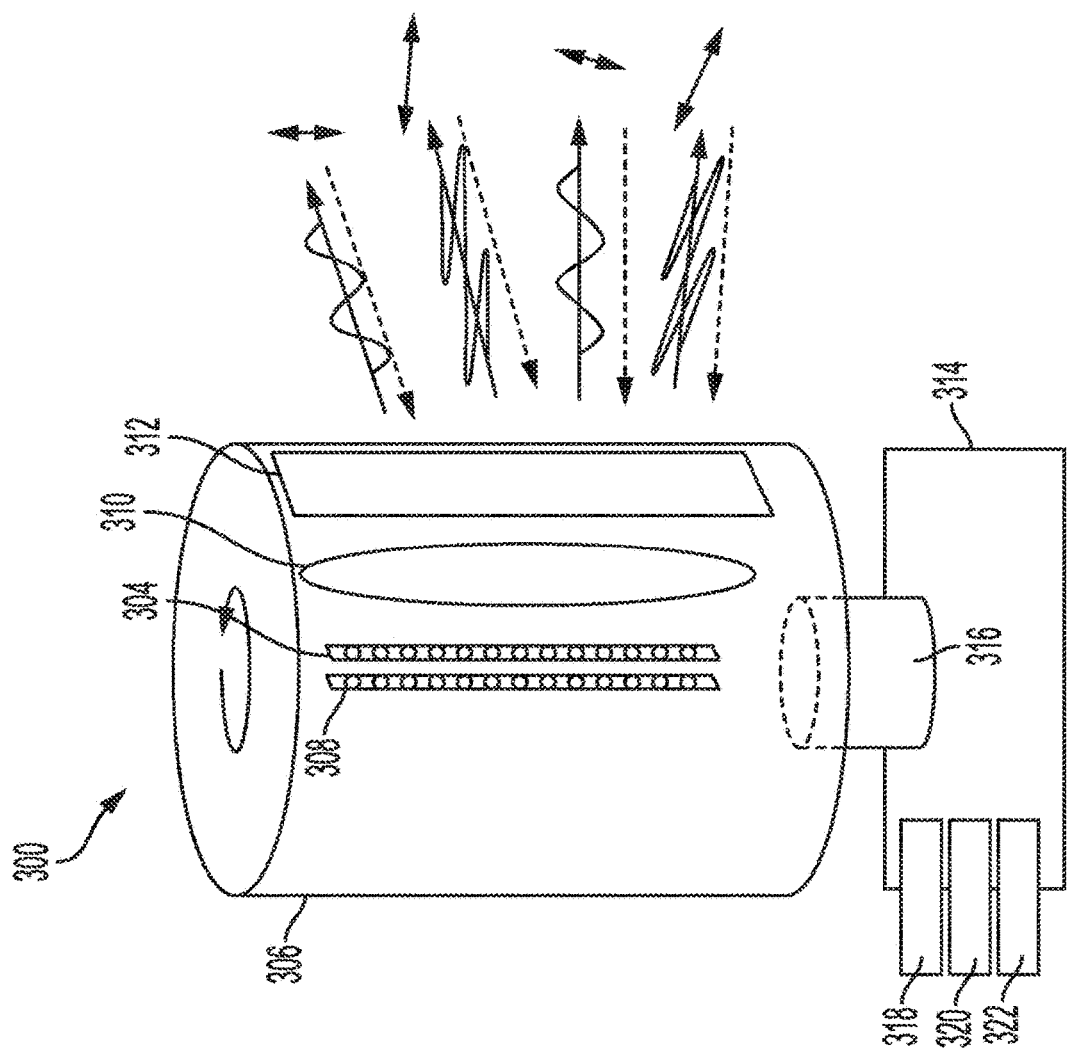
FIG. 3 is an diagram of a non-limiting embodiment of an architecture for a light detection and ranging (LiDAR) system.

Referring now to FIG. 3, FIG. 3 is an illustration of an illustrative LiDAR system 300. LiDAR sensor system 264 of FIG. 2 may be the same as or substantially similar to LiDAR system 300.

As shown in FIG. 3, LiDAR system 300 may include housing 306, which may be rotatable 360° about a central axis, such as a hub or axle of motor 316. Housing 306 may include an emitter/receiver aperture 312 made of a material transparent to light (e.g., transparent to infrared light). Although a single aperture is shown in FIG. 3, non-limiting embodiments of the present disclosure are not limited in this regard. In other scenarios, multiple apertures for emitting and/or receiving light may be provided. Either way, LiDAR system 300 can emit light through one or more of aperture(s) 312 and receive reflected light back toward one or more of aperture(s) 312 as housing 306 rotates around the internal components. In an alternative scenario, the outer shell of housing 306 may be a stationary dome, at least partially made of a material that is transparent to light, with rotatable components inside of housing 306.

Inside the rotating shell or stationary dome is a light emitter system 304 that is configured and positioned to generate and emit pulses of light through aperture 312 or through the transparent dome of housing 306 via one or more laser emitter chips or other light emitting devices. Light emitter system 304 may include any number of individual emitters (e.g., 8 emitters, 64 emitters, 128 emitters, etc.). The emitters may emit light of substantially the same intensity or of varying intensities. The individual beams emitted by light emitter system 304 may have a well-defined state of polarization that is not the same across the entire array. As an example, some beams may have vertical polarization and other beams may have horizontal polarization. LiDAR system 300 may include light detector 308 containing a photodetector or array of photodetectors positioned and configured to receive light reflected back into the system. Light emitter system 304 and light detector 308 may rotate with the rotating shell, or light emitter system 304 and light detector 308 may rotate inside the stationary dome of housing 306. One or more optical element structures 310 may be positioned in front of light emitter system 304 and/or light detector 308 to serve as one or more lenses and/or waveplates that focus and direct light that is passed through optical element structure 310.

One or more optical element structures 310 may be positioned in front of a mirror to focus and direct light that is passed through optical element structure 310. As described herein below, LiDAR system 300 may include optical element structure 310 positioned in front of a mirror and connected to the rotating elements of LiDAR system 300 so that optical element structure 310 rotates with the mirror. Alternatively or in addition, optical element structure 310 may include multiple such structures (e.g., lenses, waveplates, etc.). In some non-limiting embodiments, multiple optical element structures 310 may be arranged in an array on or integral with the shell portion of housing 306.

In some non-limiting embodiments, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

LiDAR system 300 may include power unit 318 to power light emitter system 304, motor 316, and electronic components. LiDAR system 300 may include analyzer 314 with elements, such as processor 322 and non-transitory computer-readable memory 320 containing programming instructions that are configured to enable the system to receive data collected by the light detector unit, analyze the data to measure characteristics of the light received, and generate information that a connected system can use to make decisions about operating in an environment from which the data was collected. Analyzer 314 may be integral with LiDAR system 300 as shown, or some or all of analyzer 314 may be external to LiDAR system 300 and communicatively connected to LiDAR system 300 via a wired and/or wireless communication network or link.

Figure 4:
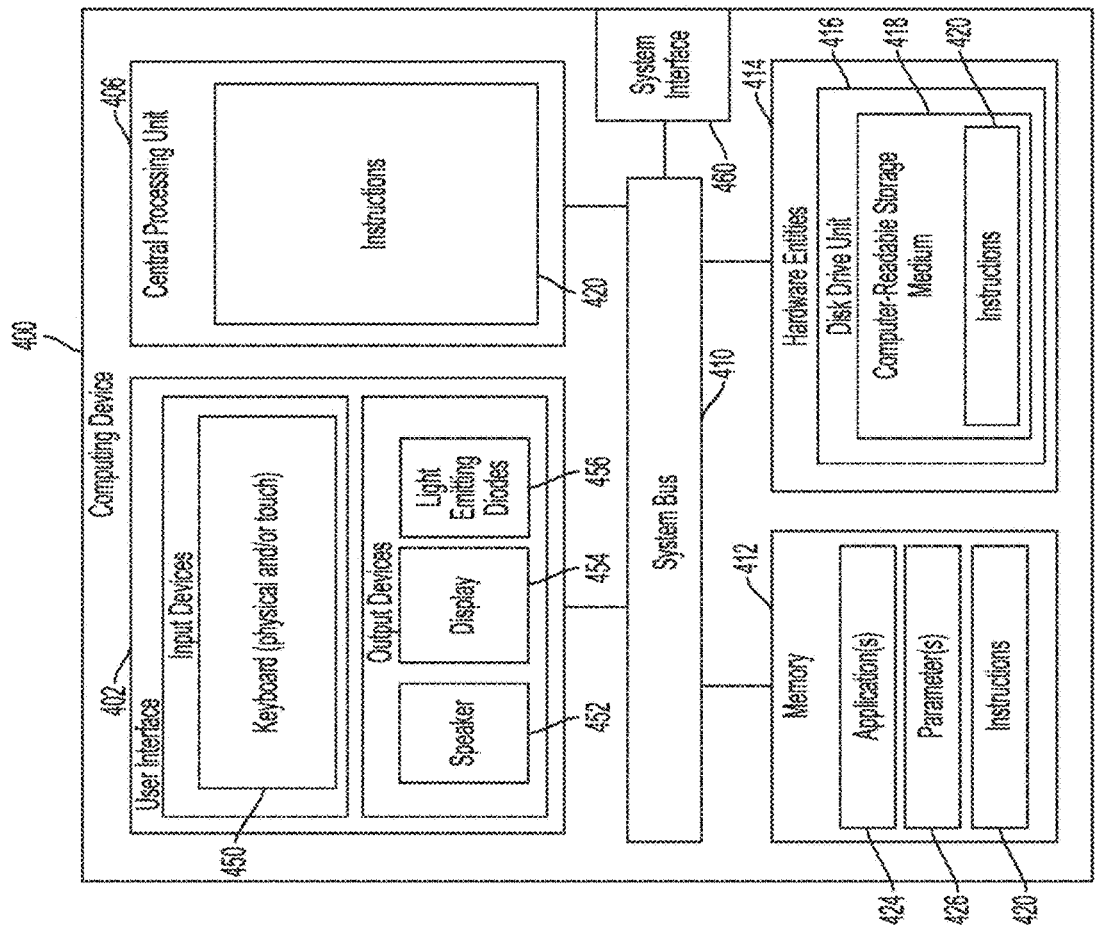
FIG. 4 is an diagram of a non-limiting embodiment of a computing device.

Referring now to FIG. 4, FIG. 4 is a diagram of an architecture for a computing device 400. Computing device 400 can correspond to one or more devices of (e.g., one or more devices of a system of) sensor management system 102, user device 104, and/or one or more devices of autonomous vehicle 106 (e.g., one or more devices of system architecture 200, etc.). In some non-limiting embodiments, one or more devices of (e.g., one or more devices of a system of) sensor management system 102, user device 104, and/or autonomous vehicle 106 (e.g., one or more devices of system architecture 200, etc.) can include at least one computing device 400 and/or at least one component of computing device 400.

The number and arrangement of components shown in FIG. 4 are provided as an example. In some non-limiting embodiments, computing device 400 may include additional components, fewer components, different components, or differently arranged components than those shown in FIG. 4. Additionally or alternatively, a set of components (e.g., one or more components) of computing device 400 may perform one or more functions described as being performed by another set of components of computing device 400.

As shown in FIG. 4, computing device 400 comprises user interface 402, Central Processing Unit (CPU) 406, system bus 410, memory 412 connected to and accessible by other portions of computing device 400 through system bus 410, system interface 460, and hardware entities 414 connected to system bus 410. User interface 402 can include input devices and output devices, which facilitate user-software interactions for controlling operations of computing device 400. The input devices may include, but are not limited to, physical and/or touch keyboard 450. The input devices can be connected to computing device 400 via a wired and/or wireless connection (e.g., a Bluetooth® connection). The output devices may include, but are not limited to, speaker 452, display 454, and/or light emitting diodes 456. System interface 460 is configured to facilitate wired and/or wireless communications to and from external devices (e.g., network nodes, such as access points, etc.).

At least some of hardware entities 414 may perform actions involving access to and use of memory 412, which can be a random access memory (RAM), a disk drive, flash memory, a compact disc read only memory (CD-ROM) and/or another hardware device that is capable of storing instructions and data. Hardware entities 414 can include disk drive unit 416 comprising computer-readable storage medium 418 on which is stored one or more sets of instructions 420 (e.g., software code) configured to implement one or more of the methodologies, procedures, or functions described herein. Instructions 420, application(s) 424, and/or parameter(s) 426 can also reside, completely or at least partially, within memory 412 and/or within CPU 406 during execution and/or use thereof by computing device 400. Memory 412 and CPU 406 may include machine-readable media (e.g., non-transitory computer-readable media). The term "machine-readable media", as used herein, may refer to a single medium or multiple media (e.g., a centralized or distributed database and/or associated caches and server) that store the one or more sets of instructions 420. The term "machine-readable media", as used herein, may refer to any medium that is capable of storing, encoding, or carrying a set of instructions 420 for execution by computing device 400 and that cause computing device 400 to perform any one or more of the methodologies of the present disclosure.

Referring now to FIG. 5, FIG. 5 is a flowchart of non-limiting embodiments of a process 500 for determining whether a diagnostic coverage of one or more sensors of an autonomous vehicle (e.g., autonomous vehicle 106) is sufficient to prevent violations of goals. In some non-limiting embodiments, one or more of the steps of process 500 may be performed (e.g., completely, partially, etc.) by sensor management system 102 (e.g., one or more devices of sensor management system 102, etc.). In some non-limiting embodiments, one or more of the steps of process 500 may be performed (e.g., completely, partially, etc.) by another device or a group of devices separate from or including sensor management system 102, such as user device 104 and/or autonomous vehicle 106 (e.g., system architecture 200 of autonomous vehicle 106, etc.).

As shown in FIG. 5, at step 502, process 500 includes determining a segment of a field of view (FOV) of a first sensor of an autonomous vehicle. For example, sensor management system 102 may determine a segment of an FOV of a first sensor of a plurality of sensors of autonomous vehicle 106. In some non-limiting embodiments, an FOV of a sensor of autonomous vehicle 106 may include a space (e.g., a space within a distance of a sensor) that is capable of being sensed by a sensor. For example, the FOV may include an area (e.g., a two-dimensional space) and/or a volume (e.g., a three-dimensional space) that is capable of being sensed by the sensor. AN FOV of a sensor may be divided into a plurality of segments. For example, the FOV may be divided into the plurality of segments, where each segment is associated with a percentage of the FOV of the first sensor.

In some non-limiting embodiments, sensor management system 102 may identify the first sensor of autonomous vehicle 106 before determining a segment of an FOV of the first sensor. For example, sensor management system 102 may identify the first sensor of the plurality of sensors of autonomous vehicle 106 based on a modality of the first sensor. In some non-limiting embodiments, the first sensor may have a modality that is the same as one or more sensors of autonomous vehicle 106. In some non-limiting embodiments, the first sensor may have a modality that is different from all other sensors of autonomous vehicle 106. In some non-limiting embodiments, sensor management system 102 may identify the first sensor of the plurality of sensors of autonomous vehicle 106 based on an input received from user device 104. For example, sensor management system 102 may identify the first sensor of the plurality of sensors of autonomous vehicle 106 based on a command received from user device 104 that includes data associated with the first sensor (e.g., identification data associated with the first sensor).

In some non-limiting embodiments, sensor management system 102 may determine whether one or more segments of the FOV of the first sensor of autonomous vehicle 106 overlaps with an FOV of a second sensor of autonomous vehicle 106. For example, sensor management system 102 may determine a plurality of segments of the FOV of the first sensor and a plurality of segments of an FOV of the second sensor. Sensor management system 102 may determine whether one or more segments of the plurality of segments of the FOV of the first sensor correspond with one or more segments of the plurality of segments of the FOV of the second sensor. In one example, sensor management system 102 may determine whether one or more segments of the plurality of segments of the FOV of the first sensor correspond with one or more segments of the plurality of segments of the FOV of the second sensor by determining whether the one or more segments of the plurality of segments of the FOV of the first sensor cover a same space as the one or more segments of the plurality of segments of the FOV of the second sensor. In some non-limiting embodiments, sensor management system 102 may determine one or more segments of the FOV of the first sensor of autonomous vehicle 106 that overlaps with an FOV of one or more additional sensors of autonomous vehicle 106.

If sensor management system 102 determines that the one or more segments of the plurality of segments of the FOV of the first sensor correspond with the one or more segments of the plurality of segments of the FOV of the second sensor, sensor management system 102 may determine that the one or more segments (e.g., one or more segments of realized overlap, one or more segments of actualized overlap, etc.) of the plurality of segments of the FOV of the first sensor overlaps with the one or more segments of the plurality of segments of the FOV of the second sensor. If sensor management system 102 determines that the one or more segments of the plurality of segments of the FOV of the first sensor do not correspond with the one or more segments of the plurality of segments of the FOV of the second sensor, sensor management system 102 may determine that the one or more segments of the plurality of segments of the FOV of the first sensor does not overlap with the one or more segments of the plurality of segments of the FOV of the second sensor.

As shown in FIG. 5, at step 504, process 500 includes calculating a scaling factor for diagnostic coverage of the segment of the FOV. For example, sensor management system 102 may calculate a value of the scaling factor for diagnostic coverage of the segment of the FOV of the first sensor of autonomous vehicle 106. The scaling factor may provide a way to scale the diagnostic coverage of the segment of the FOV to account for the FOV and modality overlap (MoD) (e.g., a value of MoD) of the first sensor and another sensor (e.g., the second sensor). In some non-limiting embodiments, sensor management system 102 may calculate the scaling factor by multiplying a value of MoD by a value of a segment of the FOV (e.g., a percentage of a segment of the FOV) of the first sensor. In some non-limiting embodiments, sensor management system 102 may calculate an overcall scaling factor for an FOV of a sensor by summing together the values of the scaling factor for each segment of a plurality of segments of the FOV of the sensor.

In some non-limiting embodiments, diagnostic coverage may refer to a percentage of a failure rate of a hardware element, such as a sensor that is detected or controlled by an implemented operational mechanism of autonomous vehicle 106. In some non-limiting embodiments, diagnostic coverage may include operational mechanisms that are implemented at different levels in the architecture of autonomous vehicle 106. In some non-limiting embodiments, to evaluate diagnostic coverage of a operational mechanism, ISO 26262-5:2018 Appendix D may be utilized to provide an estimate of diagnostic coverage (e.g., a high, medium, or low level of diagnostic coverage) that correspond to typical diagnostic coverage levels at 99%, 90%, and 60%.

By calculating the scaling factor for diagnostic coverage, the scaling factor may allow for scaling of the diagnostic coverage based on FOV overlap between the first sensor and other sensors. In addition, the scaling factor may allow for scaling diagnostic coverage by an operational design domain (ODD)—modality overlap between different sensor modalities, which may be in the same FOV (e.g., in the same segment of FOV) of the first sensor.

In some non-limiting embodiments, sensor management system 102 may calculate the value of the scaling factor for diagnostic coverage of the segment of the FOV of the first sensor of autonomous vehicle 106 based on a value of MoD for the segment of the FOV of the first sensor. In some non-limiting embodiments, sensor management system 102 may determine a value of MoD for the segment of the FOV of the first sensor based on a modality of the first sensor and a modality of the second sensor. In some non-limiting embodiments, sensor management system 102 may determine the modality of the first sensor and the modality of the second sensor. Sensor management system 102 may determine the ODD-modality-overlap between the modality of the first sensor and the modality of the second sensor. In some non-limiting embodiments, the ODD-modality-overlap between the modality of the first sensor and the modality of the second sensor may include a metric associated with a capability of the first sensor and the second sensor to detect an object in the ODD (the ODD of autonomous vehicle 106).

As shown in FIG. 5, at step 506, process 500 includes calculating a value of a metric of hardware failure for the first sensor. For example, sensor management system 102 may calculate a value of a metric of hardware failure for the first sensor of autonomous vehicle 106. In some non-limiting embodiments, sensor management system 102 may calculate a value of Probabilistic Metric for random Hardware Failures (PMHF) for the first sensor. The value of PMHF may be measured in terms of a failure in time (FIT) rate. Additionally or alternatively, sensor management system 102 may calculate a value of latent fault metric (LFM) for the first sensor and/or a value of single-point fault metric (SPFM) for the first sensor.

PMHF may represent a quantitative analysis which is used to evaluate a violation (e.g., potential violation) of a goal based on random failures of the hardware elements. PMHF may be considered to be a portion of a FIT rate that, upon occurrence, directly leads to the violation of a goal. In some non-limiting embodiments, PMHF may be expressed as average probability per hour over the operational lifetime of a hardware element. ASIL B, C, and D of ISO 26262 may provide target values of failure ratings for values of PMHF of a hardware element. For example, ASIL B and C may provide a target value of $<10^{-7}h^{-1}$, and ASIL D may provide a target value of $<10^{-8}h^{-1}$. SPFM may refer to a metric that reflects the robustness of a hardware element to single-point faults and residual faults either by diagnostic coverage from a operational mechanism or by design, referring to primarily safe faults. A high value of SPFM may indicate that a proportion of single-point faults and residual faults in the hardware element is low. ISO 26262 may provide target values of SPFM based on ASIL, for example based on ASIL B (e.g., target value of ≥90%), C (e.g., target value of ≥97%), and D (e.g., target value of ≥99%). LFM may refer to a metric that reflects the robustness of a hardware element to latent faults either by coverage of faults in operational mechanisms or by an operator (e.g., a driver) recognizing that the fault exists before the violation of the goal, or by design, referring to primarily safe faults. A high value of LFM may indicate that a proportion of latent faults in the hardware element is low. ISO 26262 may provide target values of LFM based on ASIL, for example based on ASIL B (e.g., target value of ≥60%), C (e.g., target value of ≥80%), and D (e.g., target value of ≥90%).

In some non-limiting embodiments, sensor management system 102 may calculate the value of PMHF for the first sensor based on the following formula:

Value of PMHF=Initial value of FIT*1*(1−(diagnostic coverage*scaling factor)) where the initial value of FIT (e.g., the reported value of FIT) for a sensor may be provided by an entity associated with the first sensor, such as a manufacturer of the sensor. The 1 in the formula above signifies that any fault associated with the calculation is a critical fault. This is because the initial value of FIT is already indicated as being the residual. In some non-limiting embodiments, the scaling factor may be an overall scaling factor. The overall scaling factor may include a sum of scaling factors (e.g., a value of percentage of FOV for a segment multiplied by a value of MoD for the segment) for each segment of the FOV of the first sensor.

In some non-limiting embodiments, sensor management system 102 may calculate the value of SPFM for the first sensor based on the following formula as defined in ISO 26262:

$$1 - \frac{\sum_{SR,HW}(\lambda_{SPF} + \lambda_{RF})}{\sum_{SR,HW}\lambda} = \frac{\sum_{SR,HW}(\lambda_{MPF} + \lambda_S)}{\sum_{SR,HW}\lambda}$$

in which ΣSR, HW represents a sum over all related hardware elements of an item (e.g., autonomous vehicle 106) and where $\lambda$ is a failure rate of all faults, $\lambda SPF$ is a failure rate of single point faults, $\lambda RF$ is a failure rate of residual faults, $\lambda MPF$ is a failure rate of multiple-point faults, and $\lambda S$ is a failure rate of safe faults. In some non-limiting embodiments, sensor management system 102 may calculate the value of LFM for the first sensor based on the following formula as defined in ISO 26262:

$$1 - \frac{\sum_{SR,HW}(\lambda_{MPF,L})}{\sum_{SR,HW}(\lambda - \lambda_{SPF} - \lambda_{RF})} = \frac{\sum_{SR,HW}(\lambda_{MPF,DP} + \lambda_S)}{\sum_{SR,HW}(\lambda - \lambda_{SPF} - \lambda_{RF})}$$

in which ΣSR, HW represent a sum over all related hardware elements of an item (e.g., autonomous vehicle 106) and where λ is a failure rate of all faults, λSPF is a failure rate of single point faults, λRF is a failure rate of residual faults, λMPF, L is a failure rate of latent multiple-point faults, λMPF, DP is a failure rate of detected/perceived multiple-point faults, and λS is a failure rate of safe faults.

As shown in FIG. 5, at step 508, process 500 includes determining whether to increase diagnostic coverage associated with the first sensor. For example, sensor management system 102 may determine whether to increase diagnostic coverage associated with the first sensor of autonomous vehicle 106. In some non-limiting embodiments, sensor management system 102 may compare the value of the metric of hardware failure (e.g., the value of PMHF, the value of SPFM, and/or the value of LFM) for the first sensor to a threshold value associated with the metric of hardware failure. For example, sensor management system 102 may compare the value of the metric of hardware failure to a threshold value defined by the ISO 26262 standard. In some non-limiting embodiments, the threshold value may be based on a target value defined by ASIL B, ASIL C, and/or ASIL D defined by ISO 26262. In one example, the threshold value may be equal to a PMHF target value of $<10^{-7}h^{-1}$ as defined by ASIL B or ASIL C of ISO 26262 or a PMHF target value of $<10^{-8}h^{-1}$ as defined by ASIL D of ISO 26262. In another example, the threshold value may be equal to an SPFM target value of ≥90% as defined by ASIL B, an SPFM target value of ≥97% as defined by ASIL C, or a SPFM target value of ≥99% as defined by ASIL D of ISO 26262. In another example, the threshold value may be equal to an LFM target value of ≥60% as defined by ASIL B, an LFM target value of ≥80% as defined by ASIL C, or a LFM target value of ≥90% as defined by ASIL D of ISO 26262.

In some non-limiting embodiments, if sensor management system 102 determines that the value of the metric of hardware failure (e.g., the value of PMHF, the value of SPFM, and/or the value of LFM) for the first sensor satisfies the threshold value, sensor management system 102 may determine that additional sensor coverage is not necessary in the FOV of the first sensor. In such an example, sensor management system 102 may determine not to increase a diagnostic coverage associated with the first sensor of autonomous vehicle 106. In some non-limiting embodiments, if sensor management system 102 determines that the value of the metric of hardware failure for the first sensor does not satisfy the threshold value, sensor management system 102 may determine that additional sensor coverage is necessary in the FOV of the first sensor. In such an example, sensor management system 102 may determine to increase a diagnostic coverage associated with the first sensor of autonomous vehicle 106.

As shown in FIG. 5, at step 510 ("NO"), process 500 includes foregoing determining a scheme to increase diagnostic coverage associated with the first sensor. For example, sensor management system 102 may forego determining a scheme to increase diagnostic coverage associated with the first sensor based on determining not to increase diagnostic coverage associated with the first sensor.

As shown in FIG. 5, at step 512 ("YES"), process 500 includes determining a scheme to increase diagnostic coverage associated with the first sensor. For example, sensor management system 102 may determine a scheme to increase diagnostic coverage associated with the first sensor. In some non-limiting embodiments, sensor management system 102 may determine that additional sensor coverage is necessary in the FOV of the first sensor. For example, sensor management system 102 may determine that an additional sensor having a same modality or a different modality than the first sensor should be added to increase sensor coverage in the FOV of the first sensor. In some non-limiting embodiments, sensor management system 102 may determine a control plan to alter a lifetime of the first sensor (e.g., an amount time during which the first sensor is used in operation, an operational lifetime, etc.) relative to an overall lifetime of the first sensor (e.g., a rated amount time during which the first sensor is qualified to be used in operation, a rated lifetime, etc.).

Referring now to FIGS. 6A-6D, FIGS. 6A-6D are diagrams of an implementation 600 of a process (e.g., process 500) for providing a comparison of results of simulations of operation of a simulated autonomous vehicle.

Figure 6B:
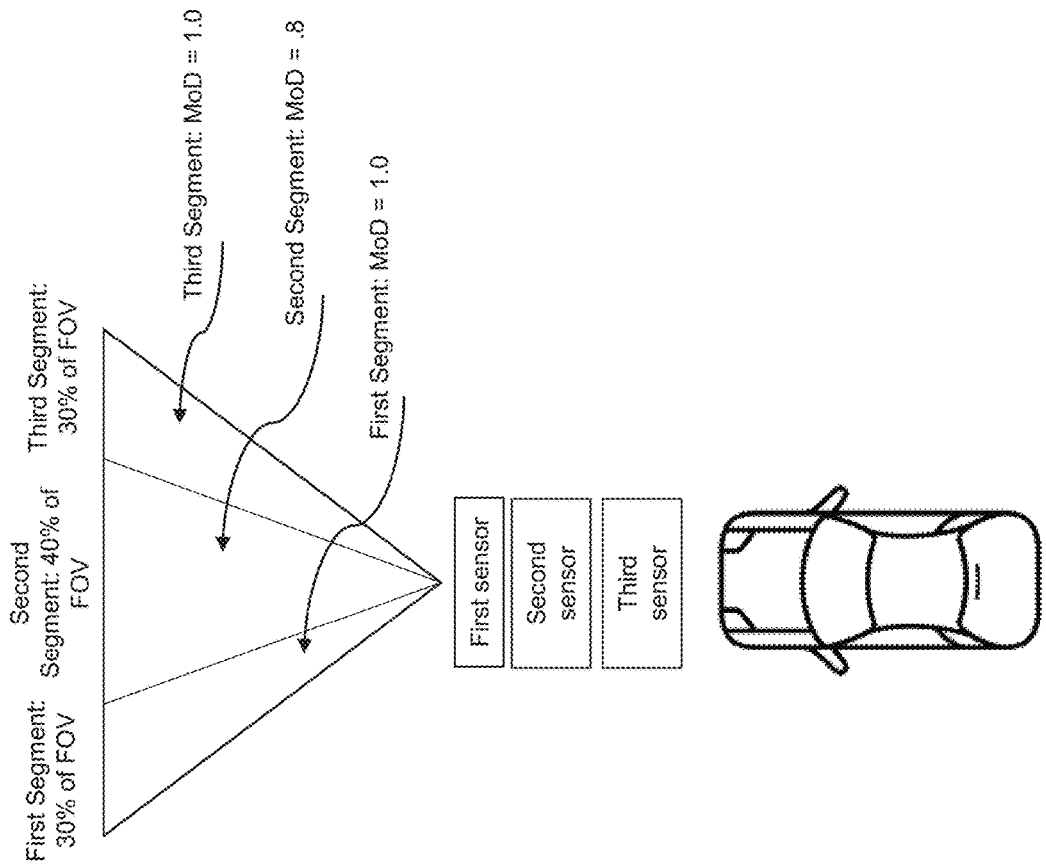
Figure 6D:
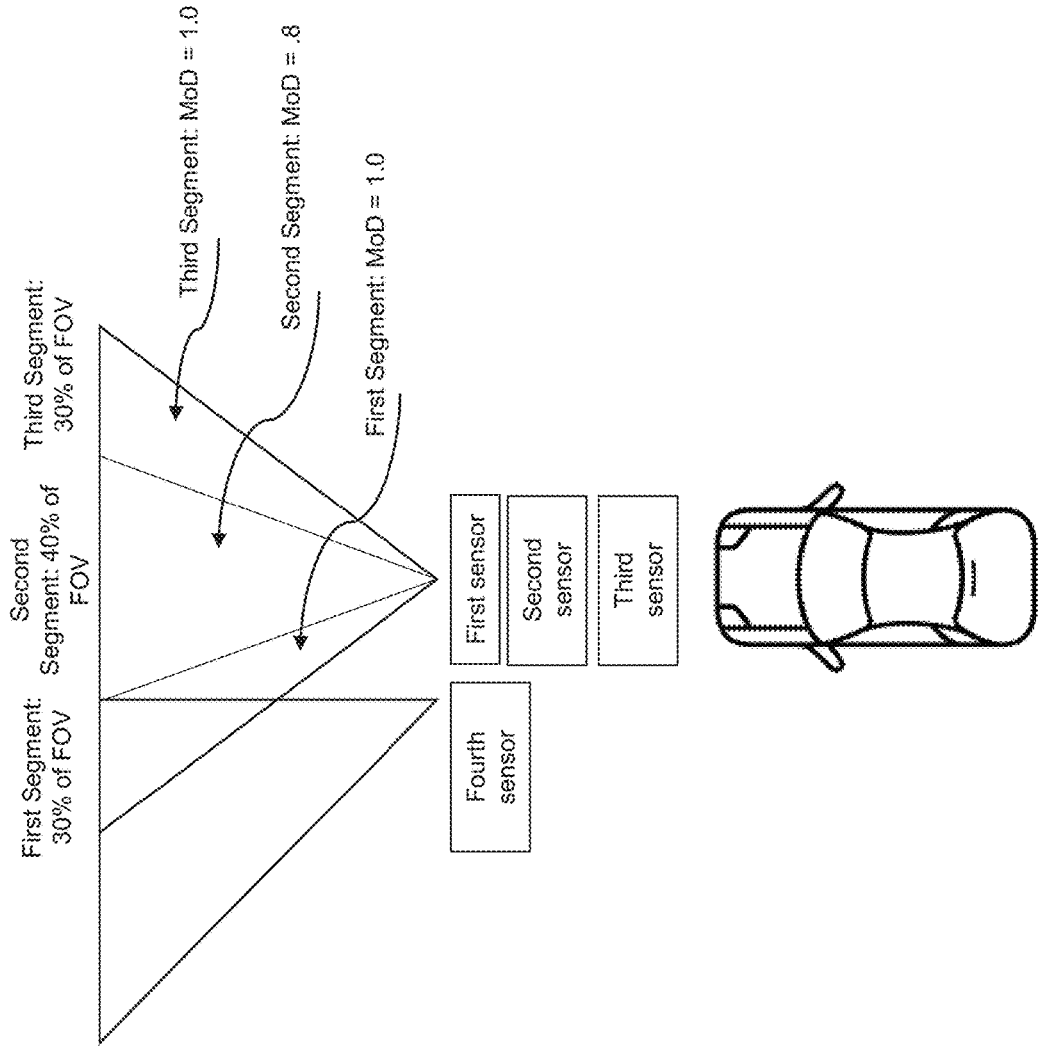

As shown by reference number 605 in FIG. 6A, sensor management system 102 may identify a first sensor of autonomous vehicle 106. In some non-limiting embodiments, sensor management system 102 may identify the first sensor of autonomous vehicle 106 based on a study for determining whether the operational mechanisms of autonomous vehicle 106 comply with a target value of a metric of hardware failure. In FIGS. 6A-6D, the first sensor of autonomous vehicle 106 may be a camera sensor (e.g., a forward facing camera sensor). In FIGS. 6B-6D, the second sensor of autonomous vehicle 106 may be a LiDAR sensor, and the third sensor of autonomous vehicle 106 may be a camera sensor.

As shown by reference number 610 in FIG. 6B, sensor management system 102 may determine a plurality of segments of a field of view (FOV) of the first sensor of autonomous vehicle 106 that overlaps with an FOV of a second sensor. As shown in FIG. 6B, the FOV of the first sensor may include a first segment, a second segment, and a third segment. The first segment may include 30% of the FOV, the second segment may include 40% of the FOV, and the third segment may include 30% of the FOV. As further shown by reference number 615 in FIG. 6B, sensor management system 102 may determine a value of modality overlap (MoD) for the plurality of segments of the FOV of the first sensor. In some non-limiting embodiments, sensor management system 102 may determine the value of MoD for each segment of the plurality of segments based on a modality of the first sensor and a modality of the second sensor. As further shown in FIG. 6B, sensor management system 102 may determine the MoD of the first segment to be 1.0, the MoD of the second segment to be 0.8, and the MoD of the third segment to be 1.0. In FIGS. 6B-6D, the first and third segments of the FOV of the first sensor may overlap with an FOV of the third sensor. In FIGS. 6B-6D, the second segment of the FOV of the first sensor may overlap with an FOV of the second sensor.

As shown by reference number 620 in FIG. 6C, sensor management system 102 may calculate a scaling factor for diagnostic coverage for each segment of the FOV of the first sensor. In some non-limiting embodiments, sensor management system 102 may calculate an overall scaling factor for the plurality of segments of the FOV of the first sensor. As shown in FIG. 6C, the overall scaling factor would be equal to 0.92. This is based on (0.3*1)+(0.4*0.8)+(0.3*1)=0.92. As shown by reference number 625 in FIG. 6C, sensor management system 102 may calculate a value of a metric of hardware failure for the first sensor. In some non-limiting embodiments, sensor management system 102 may calculate the value of PMHF for the first sensor based on the following formula:

Value of PMHF=Initial value of FIT*1*(1−(diagnostic coverage*overall scaling factor)).

In implementation 600 shown in FIGS. 6A-6D, the initial value of FIT may be equal to 100 and the diagnostic coverage may be equal to 90%. The value of PMHF, in terms of FIT, may be equal to 17.2 FIT.

As shown by reference number 630 in FIG. 6D, sensor management system 102 may determine to increase the diagnostic coverage associated with the first sensor. In some non-limiting embodiments, sensor management system 102 may determine to increase the diagnostic coverage associated with the first sensor based on determining that the value of the metric of hardware failure for the first sensor does not satisfy a threshold value associated with the metric of hardware failure.

As further shown by reference number 635 in FIG. 6D, sensor management system 102 may determine that additional sensor coverage is necessary in the FOV of the first sensor. For example, sensor management system 102 may determine that a fourth sensor having a same modality or a different modality than the first sensor should be added to increase sensor coverage in the FOV of the first sensor.

Figure 7:
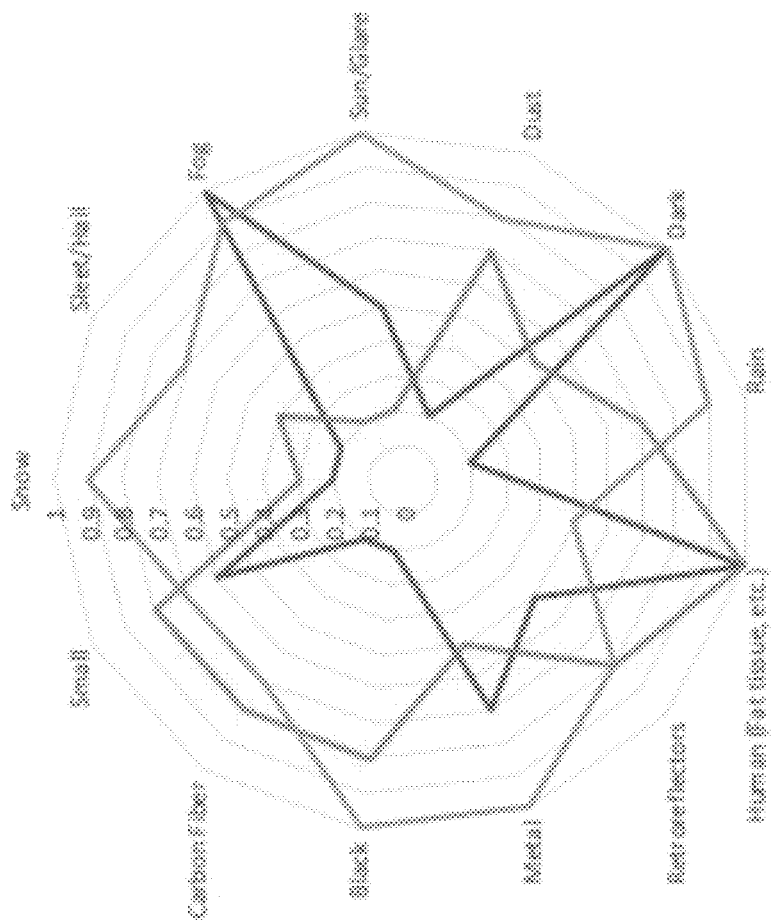
FIG. 7 is a graph of operational design domain (ODD) modality-overlap of three different sensor modalities.

Referring now to FIG. 7, FIG. 7 is a graph 710 of operational design domain (ODD) modality-overlap of three different sensor modalities. In some non-limiting embodiments, the ODD-modality-overlap between the modality of each sensor may include a metric associated with a capability of each sensor to detect an object in an ODD (an ODD of autonomous vehicle 106). In some non-limiting embodiments, the ODD-modality-overlap may be used to determine a value of MoD for a segment of an FOV of a sensor.

Although embodiments have been described in detail for the purpose of illustration and description, it is to be understood that such detail is solely for that purpose and that embodiments are not limited to the disclosed embodiments, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A system comprising:
   a memory; and
   at least one processor coupled to the memory and configured to:
   in response to determining at least one segment of a field of view (FOV) of a first sensor of an autonomous vehicle that overlaps with a FOV of at least one second sensor of the autonomous vehicle, calculate a scaling factor for diagnostic coverage for the at least one segment based on a value of modality overlap (MoD) for the at least one segment;
   calculate, based on the scaling factor, a value of a metric of hardware failure for the first sensor;
   compare the value of the metric of hardware failure to a threshold value to determine whether to increase a diagnostic coverage of the first sensor; and
   increase the diagnostic coverage of the first sensor.

2. The system of claim 1, wherein, when calculating the value of the metric of hardware failure for the first sensor, the at least one processor is configured to:
   calculate a value of Probabilistic Metric for random Hardware Failures (PMHF) for the first sensor.

3. The system of claim 2, wherein the at least one processor is further configured to:
   calculate a value of latent fault metric (LFM) for the first sensor; and
   calculate a value of single-point fault metric (SPFM) for the first sensor.

4. The system of claim 1, wherein the first sensor comprises a light detection and ranging (LiDAR) sensor, an image sensor, or a radar sensor.

5. The system of claim 1, wherein the at least one second sensor comprises a LiDAR sensor, an image sensor, or a radar sensor.

6. The system of claim 1, wherein the at least one processor is further configured to:
   determine that additional sensor coverage is necessary in the FOV of the first sensor based on determining that the value of the metric of hardware failure for the first sensor does not satisfy the threshold value associated with the metric of hardware failure.

7. The system of claim 1, wherein the at least one processor is further configured to:
   determine the value of MOD for the at least one segment of the FOV of the first sensor based on a modality of the first sensor and a modality of the at least one second sensor, wherein the modality of the first sensor is different from the modality of the at least one second sensor.

8. A computer program product comprising at least one non-transitory computer-readable medium comprising one or more instructions that, when executed by at least one processor, cause the at least one processor to:
   in response to determining at least one segment of a field of view (FOV) of a first sensor of an autonomous vehicle that overlaps with an FOV of at least one second sensor of the autonomous vehicle, calculate a scaling factor for diagnostic coverage for the at least one segment based on a value of modality overlap (MoD) for the at least one segment;
   calculate, based on the scaling factor, a value of a metric of hardware failure for the first sensor;
   compare the value of the metric of hardware failure to a threshold value to determine whether to increase a diagnostic coverage of the first sensor; and
   increase the diagnostic coverage of the first sensor.

9. The computer program product of claim 8, wherein the one or more instructions that cause the at least one processor to calculate the value of the metric of hardware failure for the first sensor, the at least one processor is programmed or configured to:
   calculate a value of Probabilistic Metric for random Hardware Failures (PMHF) for the first sensor.

10. The computer program product of claim 9, wherein the one or more instructions further cause the at least one processor to:
    calculate a value of latent fault metric (LFM) for the first sensor; or
    calculate a value of single-point fault metric (SPFM) for the first sensor.

11. The computer program product of claim 8, wherein the first sensor comprises a light detection and ranging (LiDAR) sensor, an image sensor, or a radar sensor.

12. The computer program product of claim 8, wherein the at least one second sensor comprises a LiDAR sensor, an image sensor, or a radar sensor.

13. The computer program product of claim 8, wherein the one or more instructions further cause the at least one processor to:
    determine that additional sensor coverage is necessary in the FOV of the first sensor based on determining that the value of the metric of hardware failure for the first sensor does not satisfy the threshold value associated with the metric of hardware failure.

14. The computer program product of claim 8, wherein the one or more instructions further cause the at least one processor to:
    determine the value of MOD for the at least one segment of the FOV of the first sensor based on a modality of the first sensor and a modality of the at least one second sensor, wherein the modality of the first sensor is different from the modality of the at least one second sensor.

15. A method, comprising:
    in response to determining at least one segment of a field of view (FOV) of a first sensor of an autonomous vehicle that overlaps with a FOV of at least one second sensor of the autonomous vehicle, calculating, with at least one processor, a scaling factor for diagnostic coverage for the at least one segment based on a value of modality overlap (MoD) for the at least one segment;
    calculating, with the at least one processor, a value of a metric of hardware failure for the first sensor based on the scaling factor;
    comparing, with the at least one processor, the value of the metric of hardware failure to a threshold value to determine whether to increase a diagnostic coverage of the first sensor; and
    increasing, with the at least one processor, the diagnostic coverage of the first sensor.

16. The method of claim 15, wherein calculating the value of the metric of hardware failure for the first sensor comprises:
    calculating a value of Probabilistic Metric for random Hardware Failures (PMHF) for the first sensor.

17. The method of claim 16, further comprising:
    calculating a value of latent fault metric (LFM) for the first sensor; and
    calculating a value of single-point fault metric (SPFM) for the first sensor.

18. The method of claim 15, further comprising:
    determining that additional sensor coverage is necessary in the FOV of the first sensor based on determining that the value of the metric of hardware failure for the first sensor does not satisfy the threshold value associated with the metric of hardware failure.

19. The method of claim 15, further comprising:
    determining the value of MOD for the at least one segment of the FOV of the first sensor based on a modality of the first sensor and a modality of the at least one second sensor, wherein the modality of the first sensor is different from the modality of the at least one second sensor.

* * * * *